United States Patent
Shintani et al.

(10) Patent No.: US 7,840,990 B2
(45) Date of Patent: Nov. 23, 2010

(54) BI-DIRECTIONAL REMOTE CONTROL UNIT AND METHOD OF USING THE SAME

(75) Inventors: Peter Rae Shintani, San Diego, CA (US); Hirofumi Usui, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 12/585,863

(22) Filed: Sep. 28, 2009

(65) Prior Publication Data

US 2010/0043027 A1  Feb. 18, 2010

Related U.S. Application Data

(63) Continuation of application No. 10/324,149, filed on Dec. 20, 2002, now Pat. No. 7,607,156, which is a continuation of application No. 09/188,225, filed on Nov. 9, 1998, now Pat. No. 6,532,592.

(51) Int. Cl.
*H04N 7/173* (2006.01)
*H04N 5/44* (2006.01)

(52) U.S. Cl. .................. 725/133; 725/141; 348/734

(58) Field of Classification Search ................ 725/133, 725/141; 348/734
See application file for complete search history.

(56) References Cited

U.S. PATENT DOCUMENTS

| | | | |
|---|---|---|---|
| 5,282,028 A * | 1/1994 | Johnson et al. | ............. 725/139 |
| 5,410,326 A | 4/1995 | Goldstein | |
| 5,410,367 A | 4/1995 | Zahavi et al. | |
| 5,485,221 A | 1/1996 | Banker et al. | |
| 5,592,551 A | 1/1997 | Lett et al. | |
| 5,625,608 A | 4/1997 | Grewe et al. | |
| 5,710,605 A | 1/1998 | Nelson | |
| 5,737,030 A | 4/1998 | Hong et al. | |
| RE35,952 E * | 11/1998 | Beery | .......................... 348/731 |
| 6,111,611 A * | 8/2000 | Ozkan et al. | ................. 348/465 |
| 6,130,726 A * | 10/2000 | Darbee et al. | ............... 348/734 |

* cited by examiner

*Primary Examiner*—Hunter B Lonsberry
(74) *Attorney, Agent, or Firm*—Rader, Fishman & Grauer PLLC

(57) ABSTRACT

A bi-directional communications link between a television set and a remote control unit assists a viewer in controlling the entertainment system. The television set can signal the remote control unit to confirm instruction signal received from the remote control unit. The television can also transmit electronic program guide information to the remote control unit which is displayed on a display device on the remote control unit. The television can send the remote control unit a listing of available sub-channels within a single digital channel. The listing is displayed on the remote's display device, and the viewer can then choose from among the sub-channels.

14 Claims, 5 Drawing Sheets

BI-DIRECTIONAL REMOTE CONTROL UNIT AND METHOD OF USING THE SAME

CROSS REFERENCE TO RELATED APPLICATIONS

This is a continuation application of U.S. patent application Ser. No. 10/324,149, filed Dec. 20, 2002, which is a continuation application of U.S. patent application Ser. No. 09/188,255, filed Nov. 9, 1998, now U.S. Pat. No. 6,532,592, the entire contents of which are incorporated herein by reference.

FIELD OF THE INVENTION

The present invention relates to the field of remote controls for television sets. More particularly, the present invention relates to a bi-directional remote control which receives information from a television set in addition to sending instructions to the television set.

BACKGROUND OF THE INVENTION

With a conventional television set and remote control unit, the flow of information is one-way only, namely, from the remote control unit to the television. The remote control unit may signal the television set to change the volume, change the channel being received by the television, etc. In this way, the remote control unit can be used to control the television set. The remote control may also be used to control peripheral devices such as video cassette recorders, video disk players and audio equipment connected to the television set.

However, in order to prevent the television for responding incorrectly to the signals from the remote control unit, the television set is typically programmed not to respond to the remote control unit until the same instructional signal has been received from the remote control unit a predetermined number of times. For example, when the user presses a button on the remote control unit to change the channel, the remote control unit will automatically signal the television to make the indicated channel change a number of times. When the television receives the same command from the remote control redundantly, the television presumes it is correctly receiving the transmission from the remote control unit and executes the instructions received.

This safeguard helps insure that the television has properly understood and received the signal from the remote control unit and prevents mistakes in controlling the television. However, the requirement that the television wait for identical redundant signaling from the remote control unit necessarily slows the response of the television set to the remote control.

Additionally, with the advent of cable television, satellite television and digital television broadcasts, the amount of programming from among which a viewer can choose is tremendous. For example, one digital channel may carry several different programs, or sub-channels, simultaneously. This proliferation of programming makes it more and more difficult for a viewer to locate the programming he or she most desires to see.

While a conventional remote control unit allows the viewer to control the television set from across the room, it does not assist the viewer in navigating among the many channels available to find the most desired programming. For example, when tuning a digital channel which carries several sub-channels, the viewer must first select the digital channel. The television will then tune the digital channel. One of the sub-channels will be indicated as the default sub-channel, and the television will display the programming on the default sub-channel.

Thus, the user will then have to indicate whether a different sub-channel is desired. The user may do this by having the television's on-screen display (OSD) list the sub-channels available from which the user can select. However, this arrangement raises several problems.

First, the OSD is displayed over the programming on the default sub-channel. This obscures the programming on the default sub-channel so that it cannot readily be observed and evaluated by the user if the user so desires.

Second, the television may not begin to display the programming on the default sub-channel until all the sub-channel information has been acquired. This necessarily delays the acquisition and display of the default sub-channel, which may be the only channel in which the viewer is interested.

Consequently, there is a need in the prior art for a remote control unit and television set which can more rapidly and readily execute the user's instructions and which can assist the user in navigating among the variety of available programming.

SUMMARY OF THE INVENTION

It is an object of the present invention to meet the above-described needs and others. Specifically, it is an object of the present invention to provide a remote control unit and television set which can more rapidly and readily execute the user's instructions and which can assist the user in navigating among the variety of available programming.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied as an entertainment system including: a remote control unit with a communications unit having both a transmitter and a receiver; and a television set with another communications unit also having both a transmitter and a receiver. With this arrangement, data signals can be sent and received by both the remote control unit and the television.

This allows improved interaction between the television and the remote control unit. For example, preferably the television set sends a confirmation signal to the remote control unit when a valid instruction signal is received by the television set from the remote control unit. Alternatively, the television set sends an error signal to the remote control unit when an invalid instruction signal is received by the television set from the remote control unit.

The television set may also send a prompt signal to the remote control unit when an instruction signal received by the television set from the remote control unit requires additional input in order to execute the instruction represented by the instruction signal. For example, the instruction may be an instruction for the television set to tune a digital channel having a plurality of sub-channels; and the prompt signal may include a listing of the plurality of sub-channels from which the viewer can choose.

Preferably, the remote control unit further comprises a display device. If a display device is provided on the remote control unit, the listing of the plurality of sub-channels in the foregoing example may be displayed on the display device. With a display device, the television may also transmit electronic program guide information to the remote control unit which the remote control unit displays on the display device.

When a peripheral device is connected to the television set, the television set may transmit a set of commands for the peripheral device to the remote control unit so that the remote control unit can transmit command signals to the peripheral device through the television set. Additionally, the television set may send a delete signal to the remote control unit to delete the set of commands when the peripheral device is disconnected from the television set.

The present invention also encompasses the method inherent in using the entertainment system described above. Specifically, a method of the present invention includes transmitting data signals which are both sent and received by both a remote control unit and a television set.

The method steps for enhanced communication between the television set and the remote control unit include sending a confirmation signal to the remote control unit from the television set when a valid instruction signal is received by the television set from the remote control unit; sending an error signal to the remote control unit from the television set when an invalid instruction signal is received by the television set from the remote control unit; and sending a prompt signal to the remote control unit from the television set when an instruction signal received by the television set from the remote control unit requires additional input in order to execute an instruction represented by the instruction signal.

If the remote control unit includes a display device, the method of the present invention includes displaying data on a display of the remote control unit if the television set has access to electronic program guide information, the method of the present invention may include transmitting electronic program guide information from the television set to the remote control unit, and displaying the electronic program guide information on the display of the remote control unit.

Finally, when a peripheral device is connected to the television set, the method of the present invention includes the step of transmitting a set of commands for the peripheral device to the remote control unit from the television set so that the remote control unit can transmit command signals to the peripheral device through the television set. When the peripheral device is disconnected from the television set, the method of the present invention includes the step of sending a delete signal to the remote control unit from the television set to delete the set of commands.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Figure 1:
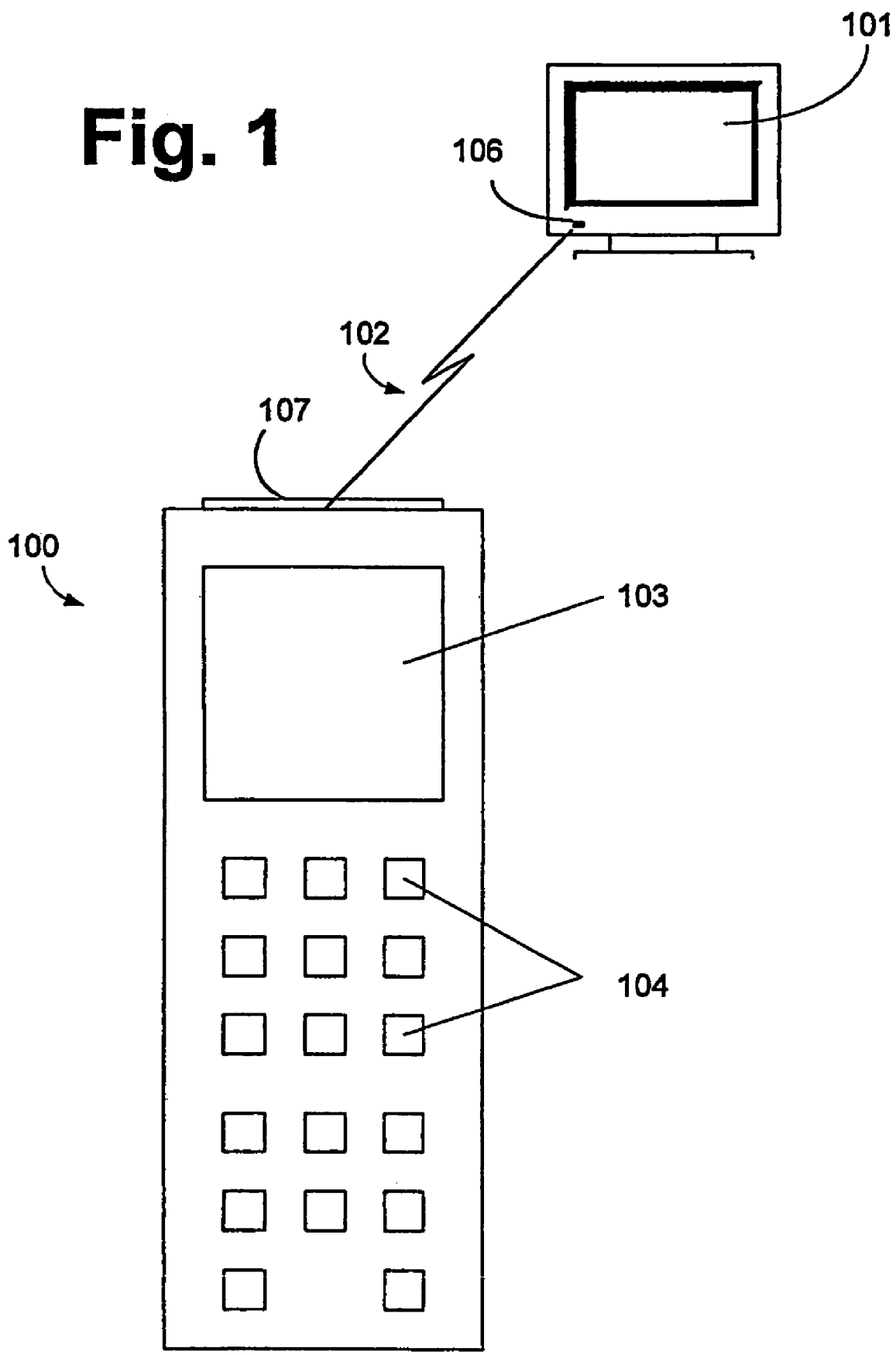
FIG. 1 is an illustration of a remote control unit and television set according to the principles of the present invention.

Using the drawings, the preferred embodiments of the present invention will now be explained. As show in FIG. 1, the present invention includes a remote control unit 100 and a television set 101. The communications link 102 between the remote control unit 100 and the television set 101 is two-way.

The remote control unit 100 has a plurality of keys or buttons 104 with which a user can enter instructions to be sent to the television set 101. Additionally, the remote control unit 100 has a display 103, for example, a liquid crystal display, on which data and information received from the television or input using the keypad 104 can be displayed. The communications unit 107 of the remote control unit 100 includes a transmitter and a receiver for both sending and receiving data signals from the television set 101.

The television 101 is equipped with a similar communications unit 106 which includes both a receiver and a transmitter for receiving signals from the remote control unit 100 and transmitting signals to the remote control unit. The signaling between the television 101 and the remote control unit 100 may be any appropriate type of signaling. For example, infrared (IR), radio-frequency (RF), ultra-sonic signaling, or combinations thereof are all acceptable and equivalent methods of transmitting data between the television 101 and the remote control 100.

With a two-way communications link between the television set 101 and the remote control 100, many of the problems with the prior art described above can be eliminated or decreased. For example, as noted above, a conventional remote control will automatically transmit an instruction to the television set a number of times so that the television can be reasonably assured of accurately receiving the message. With the two-way system of the present invention, the remote control unit 100 need only signal the television set 101 once. The set 101 can then signal the remote control as to the instruction received.

If the television 101 receives what appears to be a valid command from the remote control unit 100, the television can send a confirmation signal confirming receipt of the command and then execute the command. If the television 101 receives an invalid command, it can signal the remote control unit 100 with an error signal. The remote control unit 100 then responds by re-transmitting the command.

In this way, the remote control unit 100 need no longer automatically transmit the same command a number of times in order to insure accurate reception by the television. The result is a system which responds more readily and rapidly to the user's input.

The remote control unit 100 of the present invention can also assist a viewer in navigating among the wide variety of available programming. For example, electronic program guides which are displayed on a particular channel are common in cable and satellite systems as a method of informing viewers as to what programming is being shown.

However, such an electronic program guide may be difficult for some viewers to read if the television set is located at some distance, e.g., across a room. Moreover, a channel must be dedicated to the electronic program guide and cannot then be used for any other programming.

Under the principles of the present invention, the television set 101 can transmit the electronic program guide information to the remote control unit 100. The remote control unit 100 then displays the program guide information on the display 103. In this way, a viewer who may have trouble reading a program guide on the television screen can easily read the information on the remote control unit 100. Moreover, no channel need be used for an electronic programming guide, thereby allowing more actual programming to be shown.

The present invention can assist a viewer in navigating among the available programming in other ways as well. For example, when the user inputs a particular instruction which requires further input such as when the user selects a digital channel having several sub-channels to choose from, the television 101 can signal the remote control unit 100 with a prompt signal to request that the user input additional data. The remote control unit 100 can use the display 103 to indicate the need for additional data. Consequently, an OSD which obscures the picture on the television set 101 is unnecessary.

Figure 2:
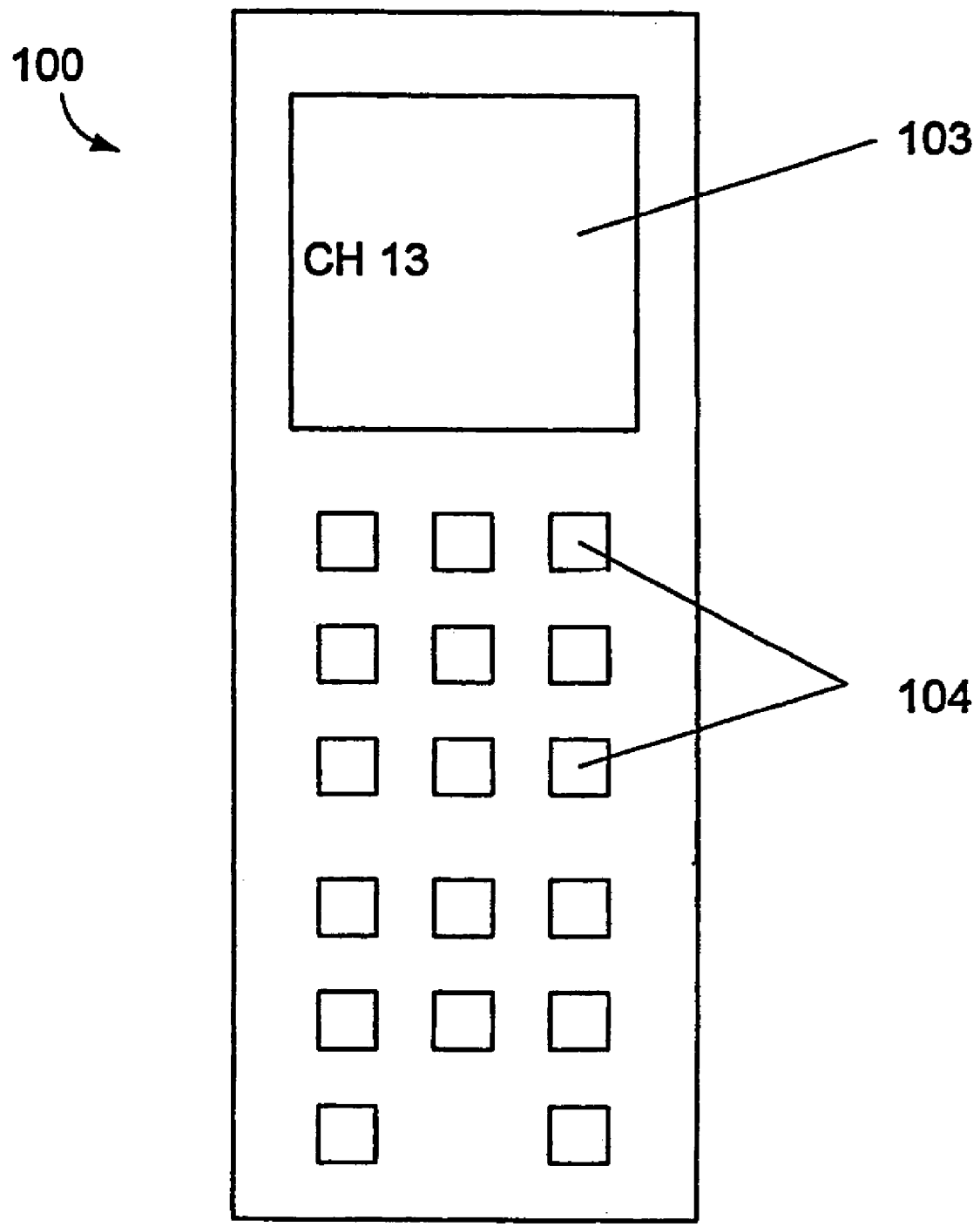
FIGS. 2 and 3 are an illustration of a remote control unit tuning assisting a viewer in tuning a digital sub-channel according to the principles of the present invention.
Figure 3:
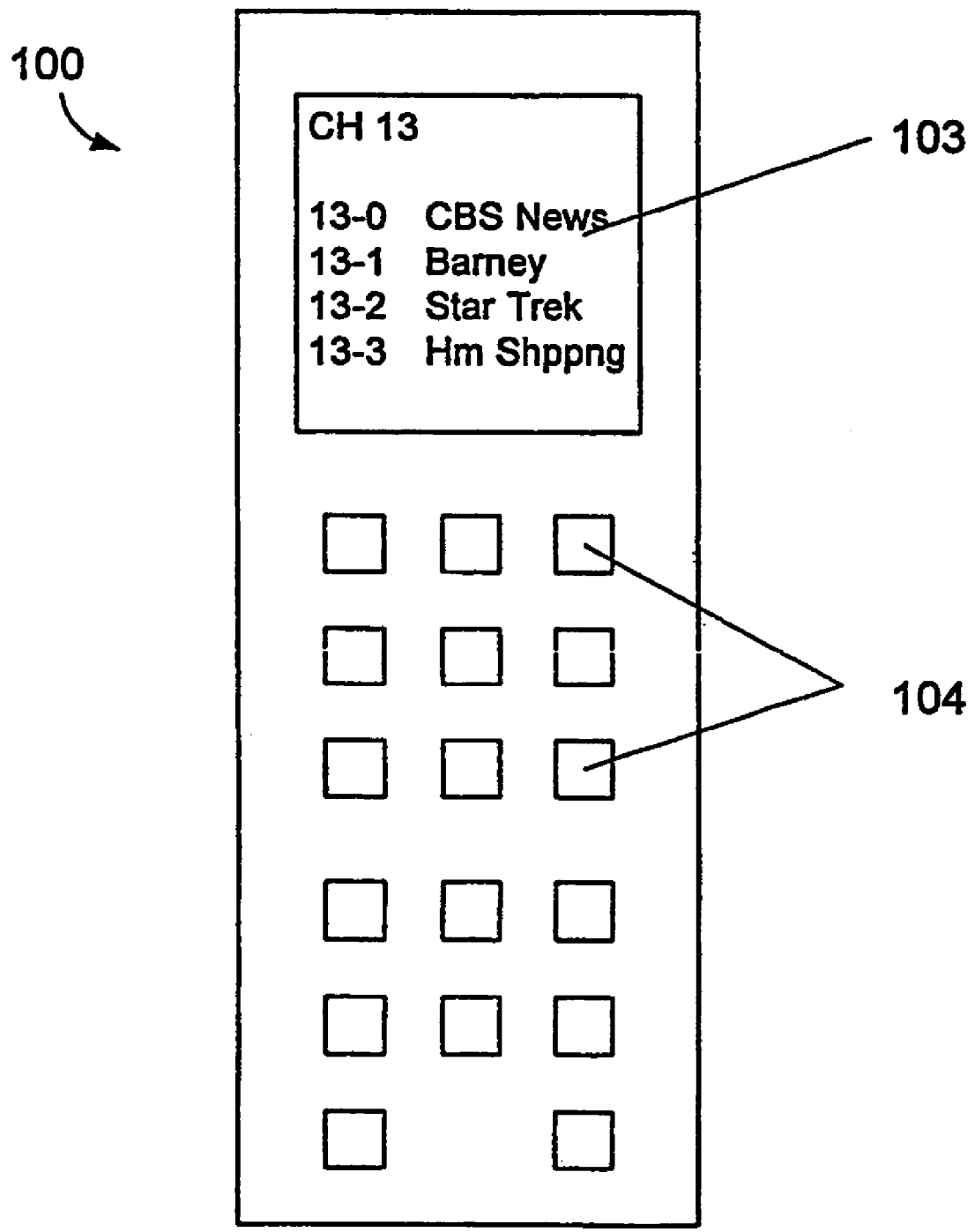

An example of this feature of the present invention is illustrated in FIGS. 2 and 3. In FIG. 2, the user inputs a request through keypad 104 that the television set 101 tune a digital channel, e.g. Channel 13. The requested channel may be printed on the display 103 as shown in FIG. 2 so that the user can verify that he or she correctly input the instruction intended.

The instruction to tune digital channel 13 is then transmitted to the television 101. The television 101 will then signal the remote control unit 100 that channel 13 is a digital channel and request that the user further indicate the desired sub-channel to be acquired.

In the example of FIG. 3, digital channel 13 comprises four sub-channels (13-0 to 13-3) which can be selected. The user can then indicate the desired sub-channel using keypad 104. The remote control unit 100 then signals the television set 101 to acquire the appropriate sub-channel. This arrangement allows the television set 101 to display the programming on the default sub-channel without waiting for the data from all available sub-channels to be acquired. The potential use of the sub-channels is handled separately through the display 103 on the remote 100.

Figure 4:
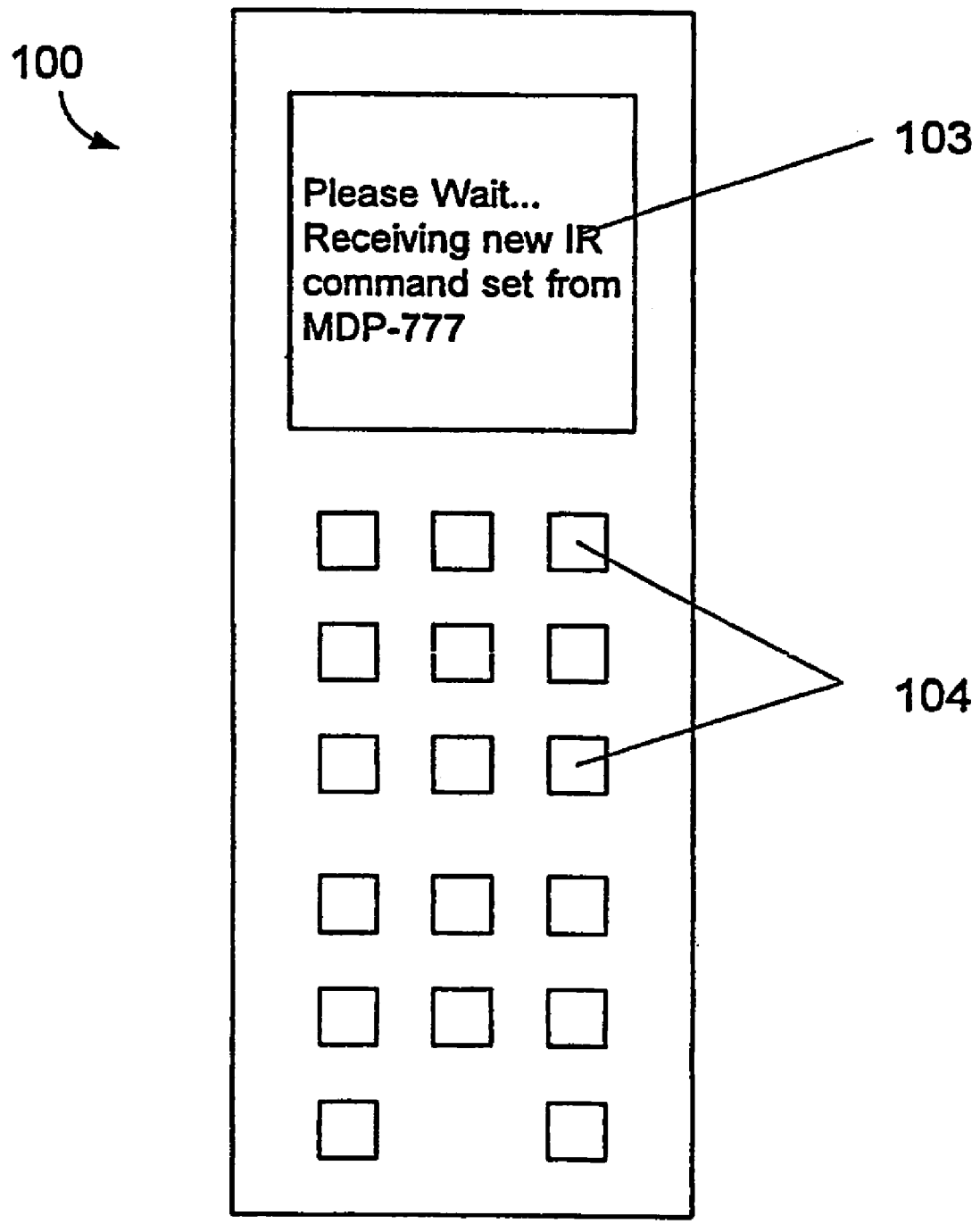
FIGS. 4 and 5 are an illustration of a remote control unit according to the principles of the present invention acquiring instructions from a new system component.
Figure 5:
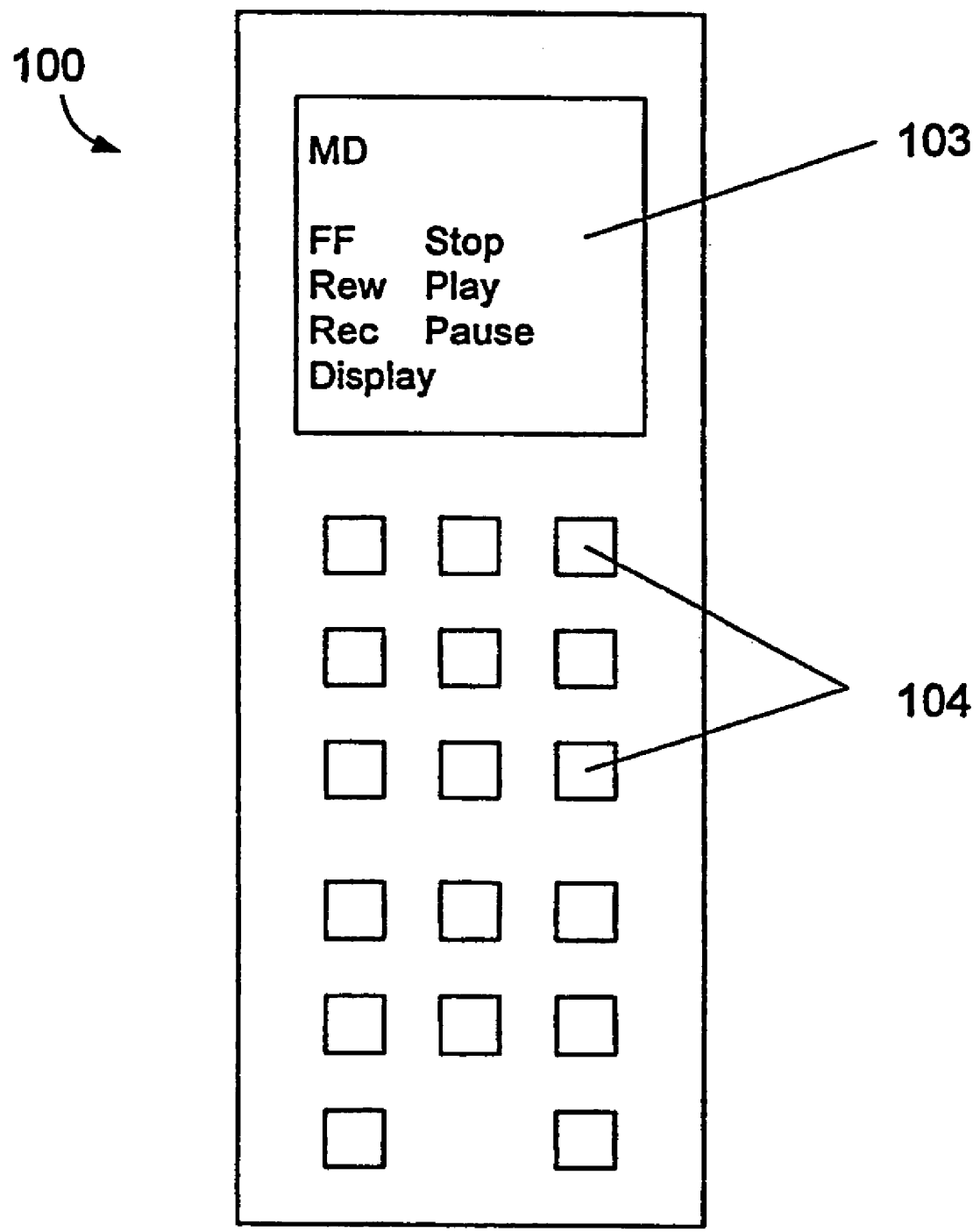

Finally, as illustrated in FIGS. 4 and 5, the two-way link between television and remote under the principles of the present invention can be used to assist in integrating new components into the television entertainment system. In the example shown in FIG. 4, a mini-disk player (MDP) (not shown) has been added to the entertainment system as a peripheral device.

Once connected to the television 101 of the present invention, the MDP will send its command set information to the television 101. The television will then transmit the command set to the remote control unit 100. As shown in FIG. 4, the display 103 of the remote 100 may print a message indicating that a new command set is being acquired for the MDP.

Once the command set is transmitted to the remote 100, the display 103 may provide a list of the available commands for the peripheral device, e.g., a MDP. As shown in FIG. 5, the MDP has available commands including: fast forward (FF), rewind (Rew), record (Rec), display, stop, play and pause.

In this way, when a new peripheral device is added to the entertainment system comprising the television 101, the remote control 100 is automatically upgraded to control the new peripheral device. In the preferred embodiment, the user need only move a cursor over the displayed list of commands shown in FIG. 5 and select the desired command for the indicated peripheral device.

Additionally, when a device is removed from the system and disconnected from the television set 101, the television 101 can signal the remote 100 with a delete signal so that the command set for that peripheral stored in the remote 100, if any, is deleted. In this manner, the remote 100 and television set 101 can coordinate control of the entertainment system.

The preceding description has been presented only to illustrate and describe the invention. It is not intended to be exhaustive or to limit the invention to any precise form disclosed. Many modifications and variations are possible in light of the above teaching.

The preferred-embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A remote control unit comprising:
    a transmitting portion configured to output an instruction, said instruction being executable by an external source;
    a receiving portion configured to receive a confirmation signal from said external source, said confirmation signal confirming receipt of said instruction by said external source;
    a display configured to display viewable information, said receiving portion receiving said viewable information from said external source,
    wherein said viewable information is a list of commands for controlling a peripheral device.

2. The remote control unit of claim 1, wherein said instruction is user enterable using keys or buttons.

3. The remote control unit of claim 1, wherein said instruction is viewable on said display.

4. The remote control unit of claim 1, wherein said peripheral device is connected to said external source, said list of commands from said peripheral device being sent to said external source.

5. The remote control unit of claim 1, wherein said viewable information is program guide information, said program guide information being a menu of programming.

6. The remote control unit of claim 1, wherein said viewable information is a list of sub-channels, a digital channel having said sub-channels.

7. The remote control unit of claim 6, wherein the channel number of said digital channel is viewable on said display.

8. The remote control unit of claim 6, wherein a sub-channel from said list of sub-channels is user selectable.

9. The remote control unit of claim 1, wherein said viewable information is a request for additional information.

10. The remote control unit of claim 9, wherein said request is from said external source.

11. The remote control unit of claim 9, wherein said receiving portion is configured to receive a prompt signal, said prompt signal being said request.

12. The remote control unit of claim 9, wherein said external source utilizes said additional information to execute said instruction.

13. The remote control unit of claim 9, wherein said additional information is obtainable from a user input.

14. The external source configured to output the confirmation signal of claim 1.

* * * * *